Figure 2:
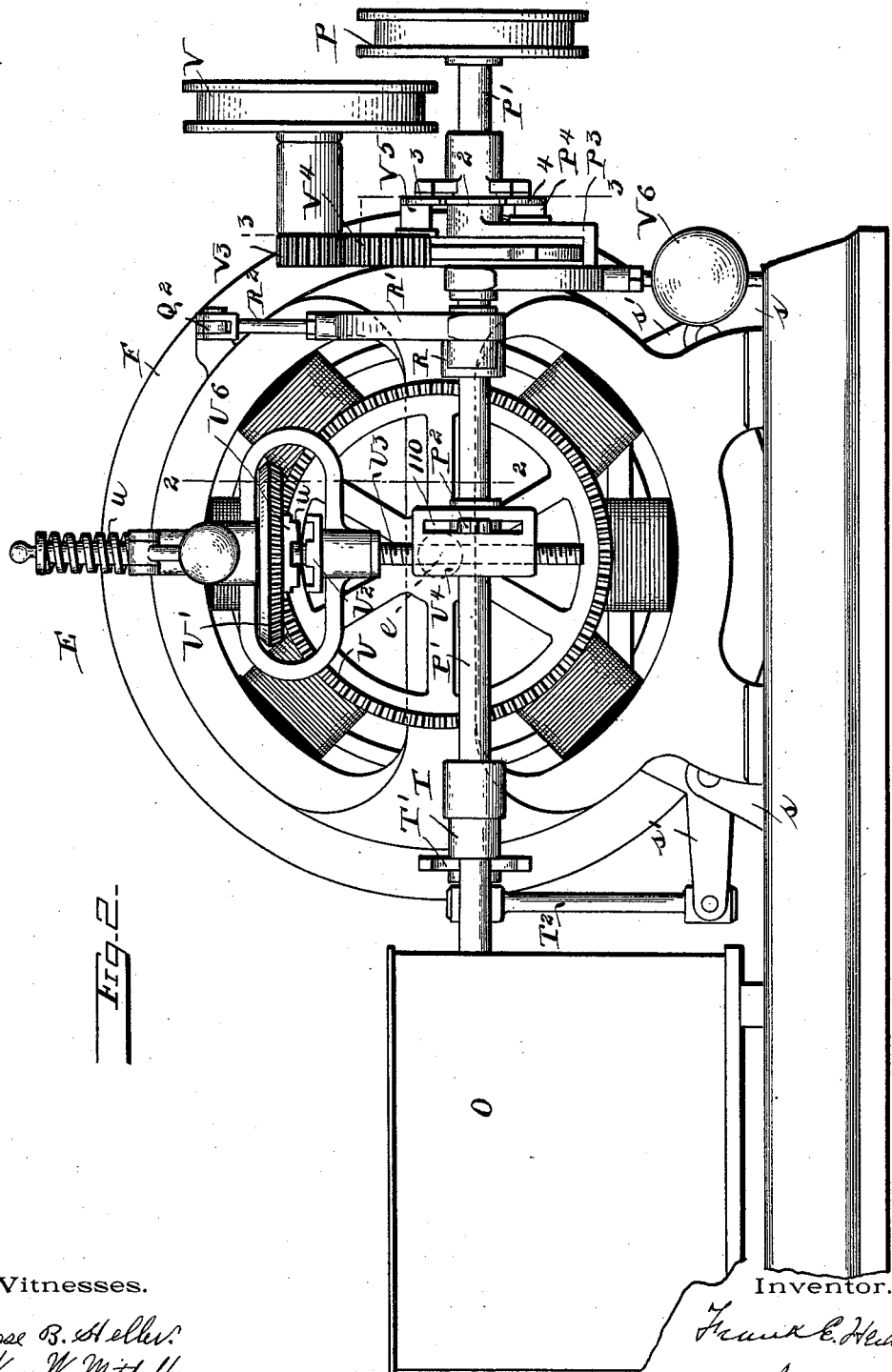

(No Model.)
F. E. HERDMAN.
ELECTRIC ELEVATOR.
No. 568,567. Patented Sept. 29, 1896.
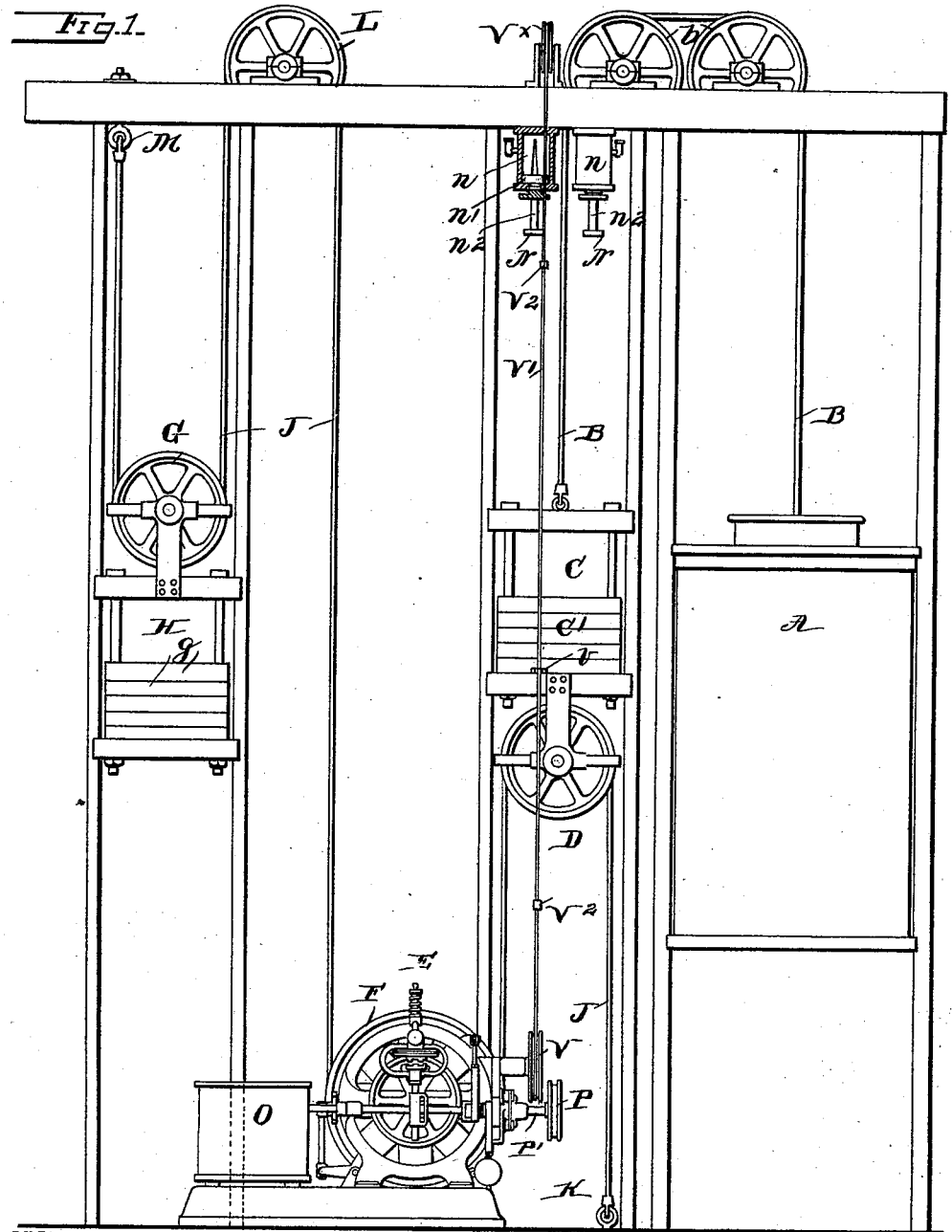
Witnesses.
Jesse B. Heller.
Wm. W. Mitchell.
Inventor.
Frank E. Herdman
Attorney.
7 Sheets—Sheet 1.

(No Model.)  7 Sheets—Sheet 2.
F. E. HERDMAN.
ELECTRIC ELEVATOR.
No. 568,567.  Patented Sept. 29, 1896.
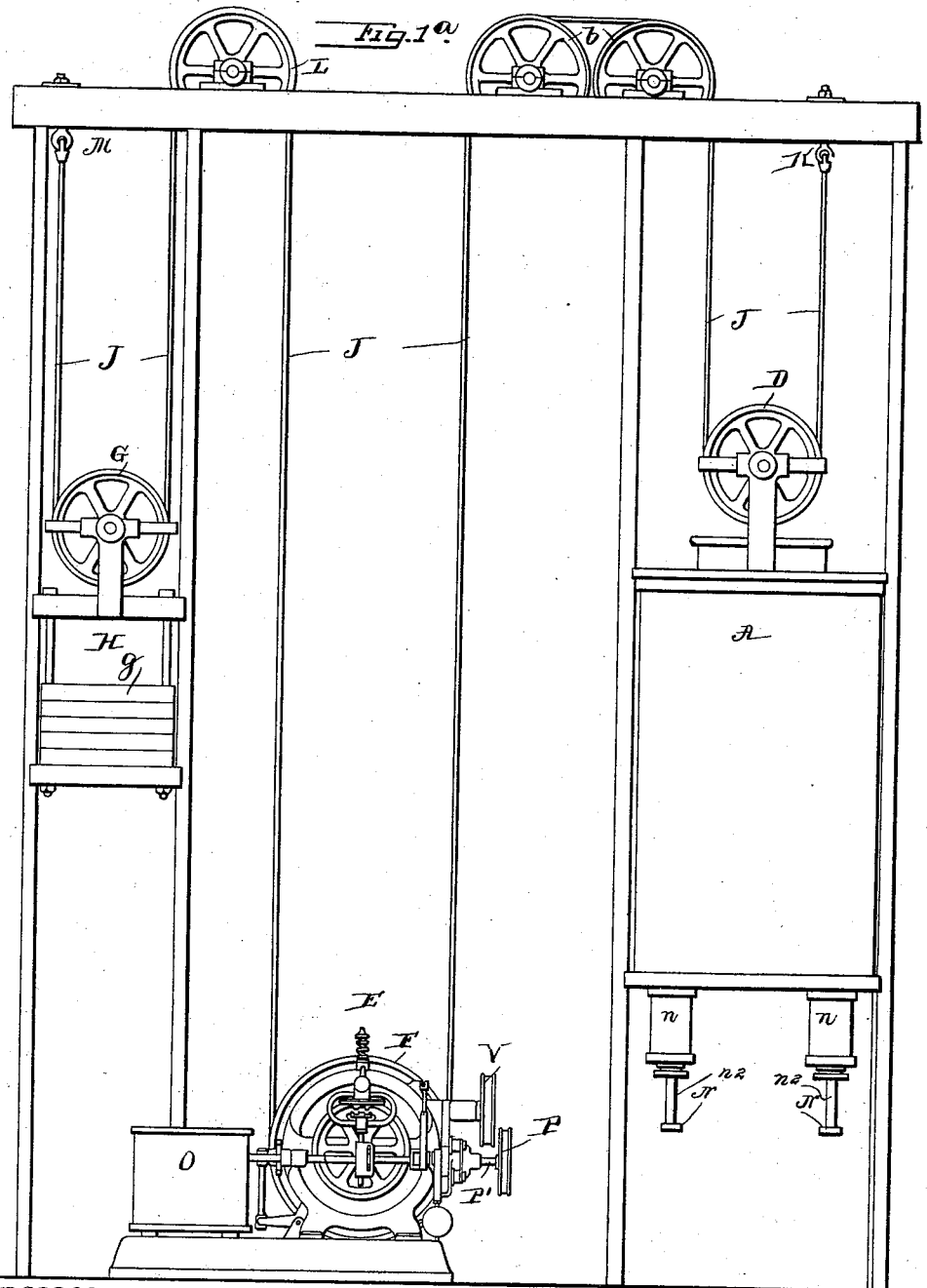
Witnesses.
Jesse B. Heller
Wm. W. Mitchell
Inventor.
Frank E. Herdman
J. D. Harding
Attorney.

(No Model.) 7 Sheets—Sheet 3.

F. E. HERDMAN.
ELECTRIC ELEVATOR.

No. 568,567. Patented Sept. 29, 1896.

Witnesses.
Jesse B. Heller
Wm. W. Mitchell

Inventor.
Frank E. Herdman
Attorney.

(No Model.) 7 Sheets—Sheet 4.

F. E. HERDMAN.
ELECTRIC ELEVATOR.

No. 568,567. Patented Sept. 29, 1896.

Witnesses.
Jesse B. Heller
Wm. W. Mitchell

Inventor.
Frank E. Herdman
G. I. Harding
Attorney.

(No Model.) 7 Sheets—Sheet 5.
F. E. HERDMAN.
ELECTRIC ELEVATOR.
No. 568,567. Patented Sept. 29, 1896.
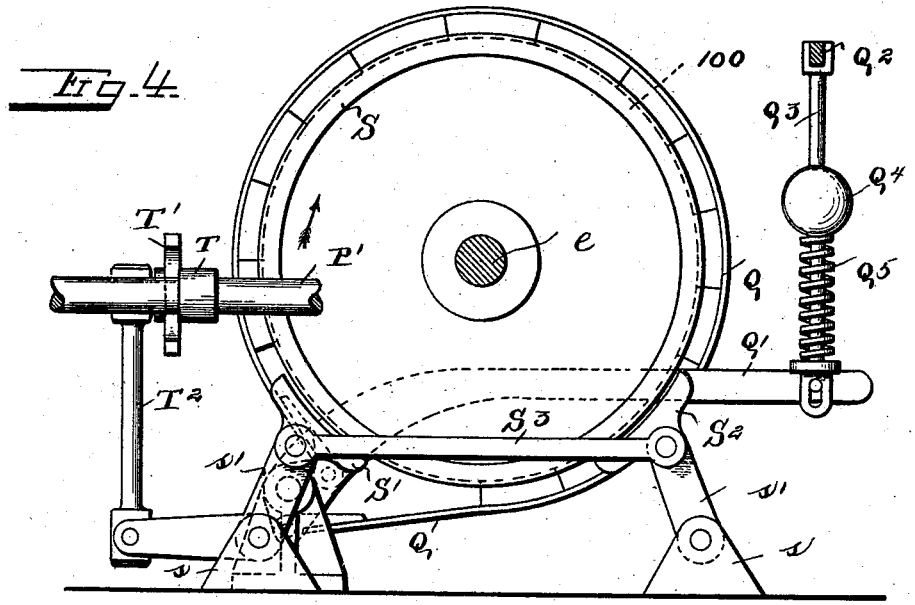
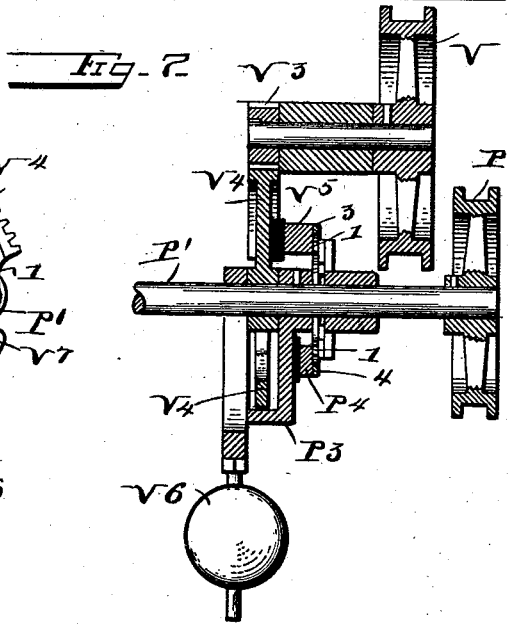
Witnesses.
Jesse B. Heller
Wm. W. Mitchell
Inventor.
Frank E. Herdman
J. F. Harding
Attorney.

(No Model.) 7 Sheets—Sheet 6.
F. E. HERDMAN.
ELECTRIC ELEVATOR.
No. 568,567. Patented Sept. 29, 1896.
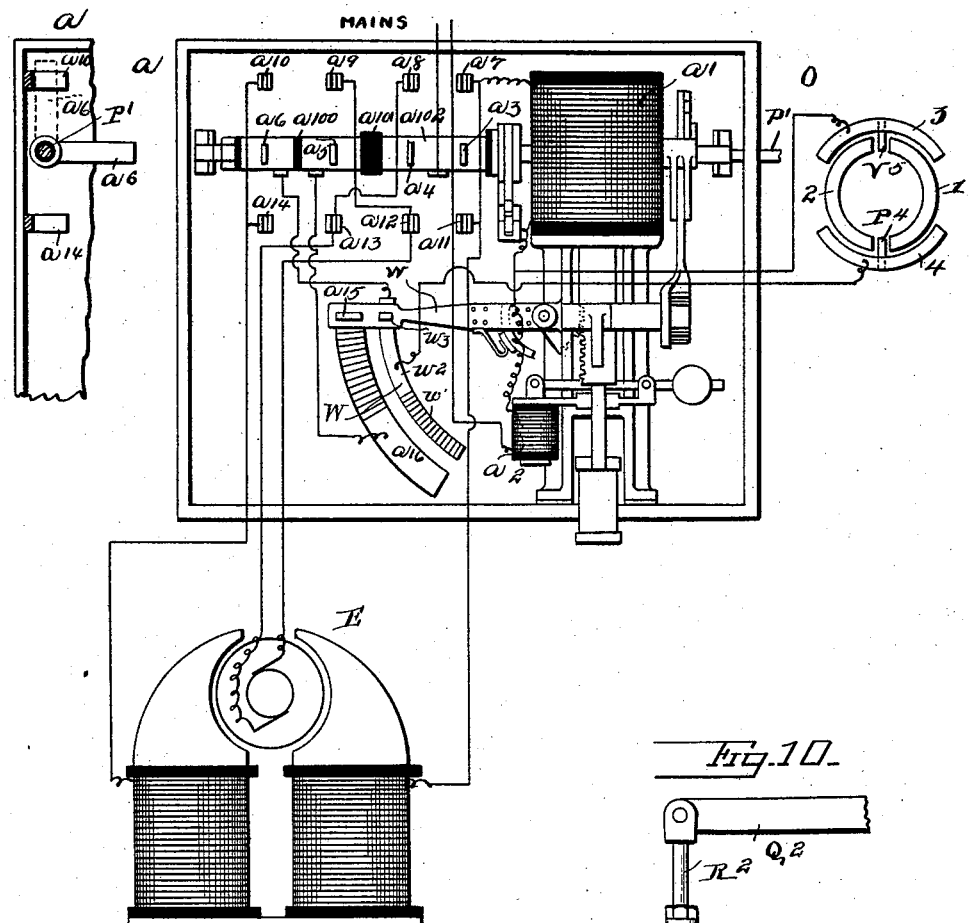
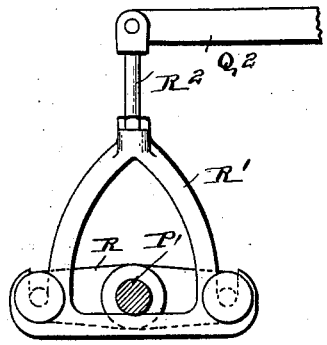
Witnesses.
Jesse B. Heller
Minnie F. Ellis
Inventor.
Frank E. Herdman
M. G. Harding
Attorney.

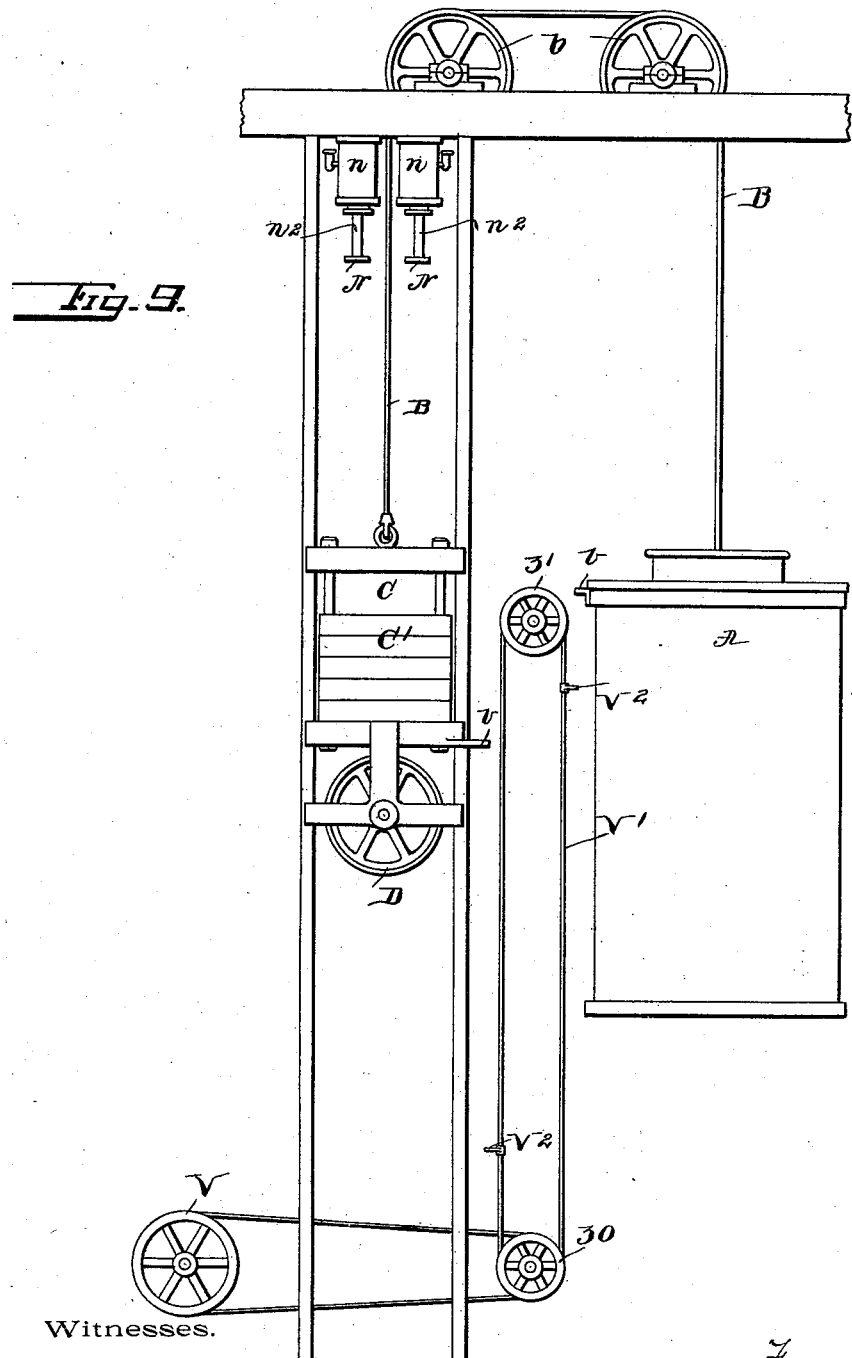

UNITED STATES PATENT OFFICE.

FRANK E. HERDMAN, OF WINNETKA, ILLINOIS.

ELECTRIC ELEVATOR.

SPECIFICATION forming part of Letters Patent No. 568,567, dated September 29, 1896.

Application filed October 5, 1895. Serial No. 564,732. (No model.)

*To all whom it may concern:*

Be it known that I, FRANK E. HERDMAN, a citizen of the United States, residing at Winnetka, county of Cook, and State of Illinois, have invented a new and useful Improvement in Electric Elevators, of which the following is a full, clear, and exact description, reference being had to the accompanying drawings, which form a part of this specification.

Primarily my invention relates to certain construction and mechanism to enable the elevator to be driven from the motor-shaft without necessity of worm and gear, as is now generally used. With the use of worm and gear there is a consequent loss by friction; also, it is necessary to use high-speed motors, which is objectionable. Connecting with the motor-shaft direct, without the intervention of worm and gear, is the ideal construction, but doing this requires such a slow-speed motor as to be impracticable.

The mechanism I am about to describe has for its object and purpose to drive the elevator from the motor-shaft without the intervention of worm and gear.

My invention further consists in certain improvements in safety-stops for the elevator-car and certain improvements in the braking and controlling of the electric motors.

I will first describe the mechanism as illustrated in the drawings, and then particularly point out the invention in the claims.

Figure 3:
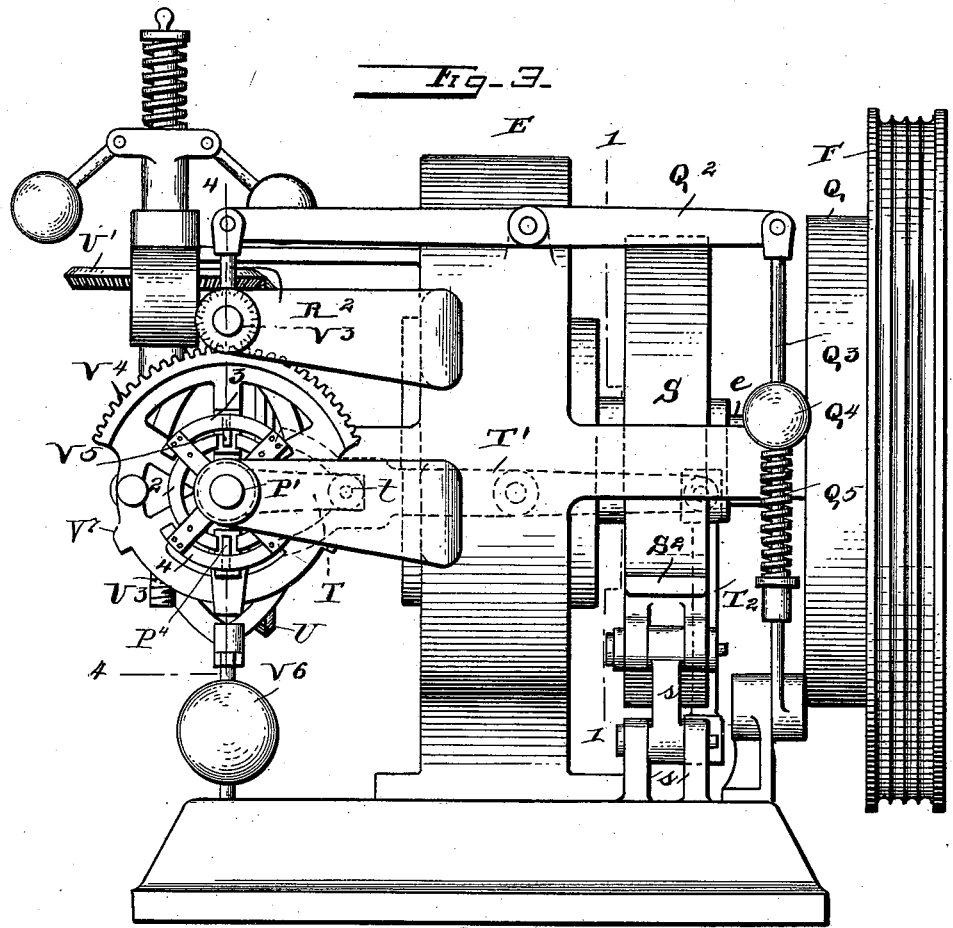
Figure 5:
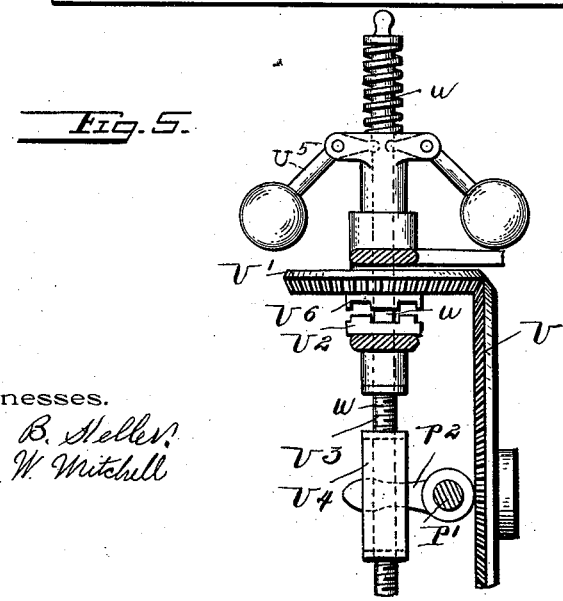

In the drawings, Figure 1 is a side elevation of an elevator and its appurtenances. Fig. 1ª is a view similar to Fig. 1 of modified form of apparatus. Fig. 2 is a side elevation of the motor and controlling mechanism. Fig. 3 is an end view of the same with the sheaves removed. Fig. 4 is a section on the line 1 1 of Fig. 3. Fig. 5 is a detail section on the line 2 2 of Fig. 2. Fig. 6 is a similar view on the line 3 3 of Fig. 2. Fig. 7 is a similar view on the line 4 4 of Fig. 3. Fig. 8 is an electrical diagram. Fig. 9 is a side elevation of a modified form of controlling device. Fig. 10 is a detail sectional view of the T R'. Fig. 11 is a vertical section through the switch-box.

A is the elevator-car; B, lifting-cables connected to the car and passing over the sheaves $b$ $b$ at the top of the shaft and connected to the frame C, which carries the sheave D. This frame can carry only the sheave D, or, in addition to the sheave, weights C', nearly sufficient to counterbalance the weight of the car A. The drawings, Fig. 1, show some counterbalance-weight C' used.

E is a slow-speed electric motor, having coupled to its shaft a sheave F, carried in heavy bearings.

G is a sheave attached to a frame H, carrying counterbalance-weights $g$. This counterbalance may only be equal to the weight of the car alone, or it may be equal to a portion of the load of the car in addition to the weight of the car itself, the remaining portion of the car-counterbalance being carried by the frame C.

J are cables, one end securely fixed to the bottom of the shaft at K. These cables pass up and around the sheave D, down and around the sheave F, thence again to the top of the shaft and around the sheave L, then down and around the sheave G, thence up and are secured at the top of the shaft at M. The cables J are driven by the frictional contact with sheave F, due to weight carried by frame H and weight of the car. When the motor is operated in one direction, say to the right, the sheave F revolves, so as to draw the sheave D downward, at the same time allowing the cable to lower the sheave G. This gives an upward movement to the car. When the motor is operated in the opposite direction, a movement in the opposite direction is given to the car. By this arrangement with the use of the sheave D the speed of the periphery of the sheave F is double that of the car A. Thus there can be used a motor of a speed twice as great as it would have to be if the car were driven directly by the sheave F, that is, if the lifting-cables passed directly around the sheave F. There can thus be used an electric motor of the same speed as that now used with a worm and gear, and yet the worm and gear can be dispensed with.

It must be borne in mind that, while the drawings show a two-to-one reduction, my invention is not confined to that, as additional sheaves can be used to obtain a greater reduction.

As may be seen from the drawings, Fig. 1, when the car reaches the top of its travel the frame H is substantially at the bottom of the shaft, and if the frame H is permitted to strike the bottom of the shaft when the car is at this point the frictional connection between the cables J and the sheave F will be destroyed, and the sheave F will run free and all further lifting of the car ceases. In the same way if the car be at the bottom of its travel and the arrangement be such that under that condition the frame C strikes or comes in contact with the top of the shaft the frictional connection between cable J and sheave F is destroyed and further action of the sheave F to lower the car is prevented. If desired, as shown in Fig. 1ª, the sheave D instead of being connected with the car by cable B, can be placed on top of the car and the cables B dispensed with, the cables J passing to the top of the shaft, thence down to and around the sheave D, attached to the car, thence up and attached to the top of the shaft. In order to make this stoppage of the car at either end of its travel a gradual stop, I provide the following means:

N are bumpers, each consisting of a cylinder $n$, filled with oil or other liquid, a piston $n'$, and the piston-rod $n^2$, which is in alinement with the frame C, the rod being of such length as to be struck by the frame when the car is a short distance from the bottom of the shaft. The cylinder $n$ has a passage from one side to the other of the piston, which passage is reduced as the piston travels from one end to the other of the cylinder. With this arrangement as the car nears the bottom of the shaft the frame C comes in contact with the piston-rods and in the further movement forces the pistons in the cylinder, which, on account of the gradually-reducing size of the passage from one side to the other of the piston, offers more and more resistance to the movement of the frame, and, in consequence, to the movement of the car, and thus the speed of the car is gradually diminished. At the same time that the bumpers are gradually reducing the speed of the sheave D they are necessarily slacking the cables J and thereby releasing the lifting power of the sheave F.

Devices similar to those first described may be used at the bottom of the shaft in connection with frame H for the purpose of regulating or causing the gradual stoppage of the ascending car. By the use of these devices a positive limit-stop for both ends of the travel of the car is provided, the arrangement preventing the further movement of the car by the motor and bringing the car gradually to a rest.

E is the motor.

O is the starting-box, in which are located the various switch mechanisms for the elevator.

P is the operating-sheave, to which the operating mechanism in the car is connected. This sheave P controls the movement of the operating-shaft P', by which the switch mechanism is controlled and the brake and other connections operated, as hereinafter described. Secured to the sheave F is the brake-wheel 100.

Q is the brake-band; Q', the brake-lever, connected to a rocker $Q^2$ by means of the connecting-rod $Q^3$, to which the lever is connected by a slot-and-pin connection. Upon the connecting-rod $Q^3$ is the weight $Q^4$, and upon the connecting-rod $Q^3$, between this weight $Q^4$ and the connection with the lever Q', is the spring $Q^5$, by means of which the brake is enabled to be gradually applied. To the end of rocker $Q^2$, opposite to its connection with connecting-rod $Q^3$, is attached a connecting-rod $R^2$, which connects with the T R'. On the operating-shaft P' is a rocker R, having pins attached to each end, said pins working in places in the T R' to receive them, so that in either direction of movement from center of operating-lever the brake is removed from the wheel. Using the brake construction alone certain difficulties arise. When the operating mechanism is thrown, say to ascend, and the brake is lifted, if the load in the car be considerable the tendency of the car will be to descend until the motor is sufficiently energized to overcome this movement. Again, if the mechanism be moved to cause the car to descend and there be a light load in the car and a heavy counterbalance the car would have a tendency to ascend until the motor was sufficiently energized to prevent such movement. To overcome this difficulty, I provide the following:

S is a secondary brake-wheel. On either side of and adjacent to the periphery of said wheel are placed the shoes S' and $S^2$, which shoes are connected with each other by the link $S^3$ and each shoe connected to a bracket $s$ by means of links $s'$. The arrangement is such that if brake-shoe S' bears against the periphery of the wheel the brake-shoe $S^2$, due to link $S^3$, is free from said wheel, and vice versa. When the shoe S' is held against the face of the brake-wheel S, then the wheel is free to move to the right or in the direction of the arrow, Fig. 4; but an opposite movement immediately wedges the shoe S' against the brake-wheel S and stops further movement in that direction.

The action of shoe $S^2$ is similar, but opposite. Upon the operating-shaft P' is the crank or lever T, having at its free end a roller $t$, working or resting in the forked end of the rocker T'. The other end of this rocker T' is connected with a connecting-rod $T^2$, which is connected with one of the links $s'$. The movement of the crank or lever T in either direction tips the rocker. The connection and arrangement, as shown, are such that when the operative mechanism is thrown so as to cause the sheave F, and consequently the wheel S, to revolve to the right or in the direction of the arrow, Fig. 4, the shoe S' rests against the brake-wheel S, and when the operative mechanism is thrown to cause the sheave F, and, in consequence, the brake-wheel S, to revolve to the left, opposite to arrow, Fig. 4, then the shoe $S^2$ is against the brake-wheel and the shoe S' clear of said wheel. It may readily be seen by this arrangement that all possibilities of the weight of load overcoming the motor at starting and causing a temporary movement in the opposite direction is avoided, for any movement in that direction clamps the shoe and prevents further movement.

In order to prevent the motor gaining excessive speed from a load in the car, which might occur if the electrical connection were in any way broken, I provide the following construction:

On the motor-shaft $e$ is placed a bevel-gear U, which meshes with the bevel-gear U' upon the shaft $u$. $U^5$ is the governor—a centrifugal governor. Feathered on the shaft $u$ and connected to the governor is a sleeve carrying the clutch member $U^6$. Below this clutch member $U^6$ is the clutch member $U^2$, secured to the screw-shaft $U^3$. Upon this screw is the traveling nut $U^4$. In the side of this nut is a slot 110, in which rests one end of a lever $P^2$, the other end being attached to the operating-shaft. The slot 110 is of length sufficient to allow the free movement of lever $P^2$ in either direction, due to throw of the operating-shaft. The operation of this device is as follows: The operating mechanism being thrown and the car in motion, the speed being greater than that for which the governor is adjusted, the balls fly out and move the clutch member $U^6$ downward into engagement with the other clutch member, $U^2$, revolving the screw-shaft $U^3$ and causing the nut $U^4$ to travel on the screw, and the end of the slot in the nut moves the lever $P^2$ toward the central position, thereby acting upon the operating-shaft P' to cut off the power and apply the brake. The governor may be so adjusted as to only cut off the power sufficiently to reduce the speed within the limits for which it is adjusted, allowing the motor to continue at that speed; but the better practice is for the mechanism to entirely cut off the power, for the excess of speed for which this mechanism would be called into play would practically only occur from some breakage or failure of some part of the mechanism.

In order to provide for the automatic reduction of the power of the motor at each end of the travel of the car, I provide the following construction, which, broadly considered, is within the principle of the construction described in a certain patent issued to me October 29, 1895, No. 548,830, and the invention is broadly covered in the claims of said patent, the portion of this application now under consideration being a specific embodiment of the generic invention claimed in said application. I will now describe the same.

V is a sheave around which passes a cable V', which extends to the top of the shaft and passes around the sheave $V^\times$ and again around the sheave V. The free ends of the cable V' are fastened to the sheave V at its central point, and it has sufficient turns upon the sheave in both directions to permit the cable being moved the desired distance. Upon the cable V' are secured stops $V^2$, one at the top and the other at the bottom of the elevator-shaft and in line with projections upon either the car or frame C. As shown, these projections $v$ are upon the frame C. The stops $V^2$ are so adjusted that they are struck by the projections before the car reaches its upper or lower limit of travel. When the projections come in contact with the stops, the cable V' is moved, causing the sheave V to revolve. To the shaft of the sheave V is attached a pinion $V^3$. This pinion meshes with a segmental gear $V^4$. This segmental gear is loose upon the shaft P'. To the brackets carrying the operating-shaft P' are secured the contacts 1, 2, 3, and 4. The segmental gear $V^4$ carries a brush $V^5$, which is insulated from it. This brush moves over the contacts 3 and 1, or 3 and 2, according to the direction in which the segmental gear is moved. To the operating-shaft is secured a crank $P^3$, carrying a brush $P^4$, insulated from it. This brush is adapted to make connection with contacts 4 and 2, or contacts 4 and 1, according to which direction the operating-shaft is moved.

W is the motor-field rheostat-plate, and $w$ the resistance-arm, controlling the field resistance. This rheostat-plate $w$ has two sections $w'$ and $w^2$, the portion $w'$ containing resistance and the portion $w^2$ being without resistance.

$a$ is the snap-switch, controlled by the operating-shaft P'. Upon this snap-switch are the brushes $a^3$ and $a^4$, in electrical connection with each other by conductive portion $a^{102}$ of hub of switch $a$, and $a^5$ and $a^6$, insulated from each other by insulation $a^{100}$ and from the brushes $a^3$ and $a^4$ by insulation $a^{101}$. These brushes $a^3$ $a^4$ $a^5$ $a^6$ in the movement of the switch in one direction make connection, respectively, with contacts $a^7$ $a^8$ $a^9$ $a^{10}$ and in the other direction, respectively, with contacts $a^{11}$, $a^{12}$, $a^{13}$, and $a^{14}$. Contacts $a^{10}$ and $a^{14}$ are in electrical connection with each other, contacts $a^8$ and $a^{13}$ in electrical connection with each other, and $a^9$ and $a^{12}$ are in electrical connection with each other, and $a^7$ and $a^{11}$ are in electrical connection with each other.

The current from one pole of the source of current supply is in electrical connection with the brushes $a^3$ and $a^4$ by being connected to conductive portion $a^{102}$. From contact $a^7$ a wire leads to the rheostat-arm controlling solenoid $a'$, and from this solenoid a wire leads to the resistance-arm $w$, and from thence a wire leads to the controlling-solenoid $a^2$, the purpose and operation of which solenoid are fully described and claimed in Letters Patent No. 530,773, dated December 11, 1894, and may be generally stated as a device for controlling the speed of movement of the resistance-arm $w$, and from thence directly to the other pole of current supply. From the contact $a^{12}$ a wire leads to one side of the armature, and from the other side of the armature a wire leads to contact $a^{13}$. A wire leads from the brush $a^5$ to the armature-resistance contact $a^{16}$ in electrical connection with brush $a^{15}$, carried by the arm $w$. From the contact $a^{11}$ a wire leads to one side of the field, and from the other side of the field a wire leads to the contact $a^{14}$. From the brush $a^6$ a wire leads to the field resistance W in electrical connection with the brush $w^3$, carried by the arm $w$. From the non-resistance portion $w^2$ of field resistance W a wire leads to the contact 4, and from contact 3 a wire leads to resistance-arm $w$. When the operating-shaft is central, the brush $P^4$ rests upon contacts 4, but free from contacts 1 and 2. When the segmental gear $V^4$ is central, its brush $V^5$ is upon contact 3, but free from contacts 1 and 2. This gear is held normally central by means of weight $V^6$. When the operating-shaft is moved, the brush $P^4$ is brought in contact with contact 1 or 2, dependent upon the direction, as well as contact 4, say it is moved to ascend, in which case it is brought in contact with contacts 4 and 2. The motor is then thrown into action, and when in complete operation the current to field is passing through the resistance $w'$.

I will now describe the passage of the current.

As may be seen, it is immaterial which way the switch is thrown, as it merely changes the direction of current in the armature. So we will suppose the switch to be thrown so that the brushes $a^3$, $a^4$, $a^5$, and $a^6$ make contact with the contacts $a^{11}$, $a^{12}$, $a^{13}$, and $a^{14}$. The current to the field passes from the contact $a^{11}$ directly to one side of the field. From the other side of the field the current passes to contact $a^{14}$, from thence by brush $a^6$ to the field-resistance contacts $w^2$, from thence by means of the arm $w$ to the controlling-solenoid $a^2$, and from thence to the other pole of current supply. The current to the armature passes from contact $a^{12}$ directly to one pole of the armature, and from the other pole of the armature passes to contact $a^{13}$ and to brush $a^5$, from brush $a^5$ to the armature resistance $a^{16}$, and from the brush $a^{16}$ to the arm $w$, to the solenoid $a^2$, to the other pole of current supply. The current to the solenoid $a'$, which moves the arm $w$, passes from the contact $a^7$, and from the solenoid $a'$ passes through the solenoid $a^2$ to the other pole of current supply. The shunt field-circuit, which, as before described, passes to the contacts 3 and 4 and is connected to the field-contact $w^2$ independent of the resistances, is normally open. When the elevator has reached near the end of its travel in that direction, the projection strikes the stop $V^2$ on the cable $V'$, revolving the sheave V and causing the segmental gear to move, so that the brush $V^5$ comes on contacts 3 and 2, thereby completing a circuit to the field independent of the resistance $w'$, and the speed of the motor and elevating apparatus is reduced. A similar action takes place when shaft $P'$ is moved in opposite direction, the brush $P^4$ making contact with contacts 4 and 1, and when the projection strikes the other stop on cable $V'$ the segmental gear is moved, so that the brush $V^5$ makes contact with contacts 3 and 1 and the field-current is increased and the speed of the motor and car decreased. Upon the lower end of the segmental gear is a projection $V^7$ in line of movement with the arm $P^3$, attached to the operating-shaft, and in the continued movement of the segmental gear in either direction, as above described, the projection $V^7$ comes in contact with the arm $P^3$ and forces the operating-shaft to its central position, cutting off the current; but before this occurs the strength of fields has been increased and the motor and car slowed down. The stop $V^5$ remains in contact with either contacts 3 and 1 or 3 and 2 until the car has been reversed and has moved a distance sufficient to allow the weight $V^6$ to bring the segmental gear and sheave V to its central position. The movement to reverse, with relation to brush $V^4$ and the shunt field-circuit, is broken, so that the motor gets up its speed entirely independent of the shunt field-circuit.

Instead of having the cable $V'$ extend the whole length of the shaft I can use the construction shown in Fig. 9, in which the sheave 31 is placed a distance in the shaft equal to that above the end of the travel the automatic device is intended to first operate. Around this sheave and a sheave 30 at the bottom passes a cable or chain $V'$. To this chain or cable is attached a projection $V^2$ at either side, one in line with a projection on car A. The frame C moving down when car moves up, and vice versa, one projection (on the frame C) is used to operate on the upward movement of the car and the other (the projection on car) on the downward movement of the car. The sheave V is connected to the sheave 30 by a belt or chain, the mechanism otherwise being and operating as in the previous description.

Having now fully described my invention, what I claim, and desire to protect by Letters Patent, is—

1. In an elevating apparatus, the combination with a car, of a frame carrying a sheave or sheaves, said frame being connected to said car by cable or cables, a counterbalance-frame carrying a sheave or sheaves, a motor provided with a shaft, a driving drum or sheave on said shaft, a cable passing around said driving drum or sheave and around the car-frame and counterbalance-sheaves, and having its ends fixedly secured.

2. In an elevating apparatus, the combination with a car, of a sheave or sheaves connected with said car, a counterbalance-frame, a sheave or sheaves carried by said counterbalance-frame, a motor provided with a shaft, a driving drum or sheave on said shaft, a cable passing around said driving drum or sheave and around the car and counterbalance-sheaves, and having its ends fixedly secured, buffer-stops adapted to limit the movement of the car in either direction or both directions, and when operated to relieve the strain on the lifting-cable.

3. In an elevating apparatus, the combination with a car, of a frame carrying a sheave or sheaves, said frame being connected to said car by cable or cables, a counterbalance-frame, carrying a sheave or sheaves, a motor provided with a shaft, a driving drum or sheave on said shaft, a cable passing around said driving drum or sheave and around the car and counterbalance-sheaves, and having its ends fixedly secured, buffer-stops adapted to limit the movement of the car and relieve the cable from the car in the movement of the car in either or both directions.

4. The combination with the motor and mechanism for controlling the same, of a wheel connected with the shaft of said motor, brake-shoes on opposite sides adjacent to the periphery of said wheel, said brake-shoes being set oppositely and connected with each other, said shoes when contiguous to the wheel allowing rotation in one direction only, but the shoes with reference to each other allowing rotation in opposite directions, and connection between said shoes and the motor-controlling mechanism, whereby in its movement in one direction one shoe is brought contiguous to the wheel, and in the other direction the other shoe is brought contiguous to the wheel.

5. The combination with a motor and mechanism for controlling the same, of a wheel connected with the shaft of said motor, brake-shoes set oppositely, and on opposite sides adjacent to the periphery of said wheel, a link connecting said shoes, and connection between said shoes and the motor-controlling mechanism, whereby a movement of the controlling mechanism in one direction brings one shoe contiguous to the wheel and the other free, and vice versa, in the other movement of the controlling mechanism, the form of the shoes being such that the shoe contiguous to the wheel allows said wheel to revolve fully in one direction, but holds it from revolution in the other direction.

6. The combination with a motor and controlling mechanism for the same, of a governor, a shaft driven from the motor-shaft, a clutch member connected with the governor feathered on said shaft driven from the motor-shaft, a screw-shaft having a clutch member in alinement with the clutch member on the shaft driven from the motor-shaft, a nut on the threaded portion of the screw-shaft, there being in said nut a slot, a lever, one end in said slot, and connection between the other end and the motor-controlling mechanism.

7. The combination with an elevating apparatus, of an electric motor for operating the same, a source of current supply, and electrical connection between the source of current supply and the field of the motor, resistance device in said circuit, a shunt-circuit to the field independent of the resistance device, a contact as 4 to which one side of said circuit is connected, a contact as 3 to which the other side is connected, contacts as 1, 2, motor-controlling mechanism, a brush connected to the motor-controlling mechanism, and adapted, according to the direction the motor-controlling mechanism is moved, to make connection between contacts 4 and 1, or 4 and 2, a segmental gear carrying a brush adapted in the movement of the segmental gear to make connection with contacts 3 and 1 or 3 and 2, and intermediate connection between said segmental gear and the elevating apparatus.

8. The combination with an elevating apparatus, of an electric motor for operating the same, a source of current supply and electrical connection between the source of current supply and the field of the motor, resistance device in said circuit, a shunt-circuit to the field independent of the resistance device, a contact as 4 to which one side of said circuit is connected, a contact as 3 to which the other side is connected, contacts as 1, 2, motor-controlling mechanism, a brush connected to the motor-controlling mechanism, and adapted according to the direction the motor-controlling mechanism is moved to make connection between contacts 4 and 1 or 4 and 2, a segmental gear carrying a brush adapted in the movement of the segmental gear to make connection with contacts 3 and 1 or 3 and 2, a gear meshing with said segmental gear, a wheel moving with said last-mentioned gear, a chain or equivalent device operating said wheel, there being projection or projections upon said chain in alinement with projection or projections upon the elevating apparatus.

9. The combination with an elevating apparatus, of an electric device for operating the same, a source of current supply and electrical connection between the source of current supply and the field of the motor, resistance device in said circuit, a shunt-circuit to the field independent of the resistance device, a contact as 4 to which one side of said circuit is connected, a contact as 3 to which the other side is connected, contacts as 1, 2, motor-controlling mechanism, a brush connected to the motor-controlling mechanism, and adapted according to the direction the motor-controlling mechanism is moved, to make connection between contacts 4 and 1, or 4 and 2, a segmental gear, carrying a brush adapted in the movement of the segmental gear to make connection with contacts 3 and 1 or 3 and 2, and intermediate connection between said segmental gear and the elevating apparatus, a projection upon said segmental gear in alinement with the motor-controlling mechanism.

10. The combination with an elevating apparatus, of an electric motor for operating the same, a source of current supply, and electrical connection between the source of current supply and the field of the motor, resistance device in said circuit, a shunt-circuit to the field independent of the resistance device, a contact as 4 to which one side of said circuit is connected, a contact as 3 to which the other side is connected, contacts as 1, 2, motor-controlling mechanism, a brush connected to the motor-controlling mechanism, and adapted according to the direction the motor-controlling mechanism is moved to make connection between contacts 4 and 1, or 4 and 2, a segmental gear carrying a brush adapted in the movement of the segmental gear to make connection with contacts 3 and 1 or 3 and 2, a gear meshing with said segmental gear, a wheel moving with said last-mentioned gear, a chain or equivalent device operating said wheel, there being projection or projections upon said chain in alinement with a projection or projections upon the elevating apparatus, a projection upon said segmental gear in alinement with said motor-controlling mechanism.

In testimony of which invention I have hereunto set my hand.

FRANK E. HERDMAN.

Witnesses:
 WM. PRESCOTT HUNT, Jr.,
 N. T. HARRINGTON.